US011697550B2

(12) United States Patent
Dacar et al.

(10) Patent No.: US 11,697,550 B2
(45) Date of Patent: Jul. 11, 2023

(54) RELOADABLE CONTAINERIZED SYSTEM FOR WET AND DRY PROPPANTS AND METHODS OF MAKING AND USING SAME

(71) Applicant: Rocky Mountain Investor Holdings, Inc., Greenwood Village, CO (US)

(72) Inventors: Marcus Dacar, Whitewood, SD (US); Daniel Richardson Pattillo, Denver, CO (US); Joshua Wyrick, Golden, CO (US); Robert C. Dacar, Spearfish, SD (US)

(73) Assignee: Rocky Mountain Investor Holdings, Inc., Greenwood Village, CO (US)

( * ) Notice: Subject to any disclaimer, the term of this patent is extended or adjusted under 35 U.S.C. 154(b) by 0 days.

(21) Appl. No.: 17/659,027

(22) Filed: Apr. 13, 2022

(65) Prior Publication Data

US 2022/0332496 A1 Oct. 20, 2022

Related U.S. Application Data

(60) Provisional application No. 63/175,450, filed on Apr. 15, 2021.

(51) Int. Cl.
*B65D 88/54* (2006.01)
*B65G 67/08* (2006.01)

(52) U.S. Cl.
CPC .............. *B65D 88/54* (2013.01); *B65G 67/08* (2013.01)

(58) Field of Classification Search
CPC ........... B01F 33/8051; B01F 35/71731; B65D 88/32; B65D 88/54; B65G 67/08; B65G 47/18
See application file for complete search history.

(56) References Cited

U.S. PATENT DOCUMENTS

| 3,362,490 A | 1/1968 | Milton |
| 4,337,878 A | 7/1982 | Brock |
| 6,368,555 B1 * | 4/2002 | Goeldner ............... A61L 11/00 422/26 |
| 9,010,382 B2 | 4/2015 | Matye |
| 9,428,330 B2 | 8/2016 | Lopez |
| 9,670,752 B2 | 6/2017 | Glynn et al. |
| 9,718,610 B2 | 8/2017 | Oren |
| 9,752,389 B2 | 9/2017 | Pham et al. |
| 9,758,082 B2 | 9/2017 | Elden, III et al. |

(Continued)

FOREIGN PATENT DOCUMENTS

| WO | 2019177681 A1 | 9/2019 |
| WO | 2020056360 A1 | 3/2020 |
| WO | 2020214147 A1 | 10/2020 |

OTHER PUBLICATIONS

Notice of Allowanced, dated Nov. 7, 2022, 8 pages, issued in U.S. Appl. No. 17/815,116.

*Primary Examiner* — Gregory W Adams
(74) *Attorney, Agent, or Firm* — Avek IP, LLC

(57) ABSTRACT

A system for reloading a container with proppant. The system includes a transloader having a conveyer belt and a discharge device. The system includes a reloading system comprising a bulk material storage bin having a proppant receiving area, a funnel having an expandable loading tube, and a gate for controlling flow of the proppant from the funnel into the container. The system comprises a reloader comprising a loading bay having a load cell and the container disposed on the load cell.

17 Claims, 8 Drawing Sheets

(56) References Cited

U.S. PATENT DOCUMENTS

| | | |
|---|---|---|
| 9,776,813 B2 | 10/2017 | McMahon |
| 9,919,882 B2 | 3/2018 | Oren et al. |
| 9,938,093 B2 | 4/2018 | Sherwood et al. |
| 10,239,712 B2 | 3/2019 | Garcia et al. |
| 10,406,962 B2 | 9/2019 | Hughes et al. |
| 10,479,255 B2 | 11/2019 | Krenek et al. |
| 10,494,187 B2 | 12/2019 | Stegemoeller |
| 10,618,724 B2 | 4/2020 | Fisher et al. |
| 10,618,725 B2 | 4/2020 | Pham et al. |
| 10,618,744 B2 | 4/2020 | Eiden, III et al. |
| 10,625,958 B2 | 4/2020 | Lucas et al. |
| 10,815,050 B2 | 10/2020 | Hess et al. |
| 11,530,090 B2 | 12/2022 | Dacar et al. |
| 2010/0038077 A1 | 2/2010 | Heilman et al. |
| 2018/0141012 A1 | 5/2018 | Lucas et al. |
| 2018/0313677 A1 | 11/2018 | Warren et al. |
| 2019/0087918 A1 | 3/2019 | Lewis et al. |
| 2020/0095060 A1 | 3/2020 | Hawkins et al. |
| 2020/0147566 A1 | 5/2020 | Stegemoeller et al. |
| 2020/0174446 A1 | 6/2020 | Lopez et al. |
| 2020/0199990 A1 | 6/2020 | Friesen |
| 2020/0239239 A1 | 7/2020 | Belcher et al. |
| 2020/0239240 A1 | 7/2020 | D'Agostino et al. |
| 2020/0240237 A1 | 7/2020 | Oehler et al. |
| 2020/0262641 A1 | 8/2020 | Friesen |
| 2022/0332496 A1 | 10/2022 | Dacar et al. |
| 2022/0356006 A1 | 11/2022 | Dacar et al. |

\* cited by examiner

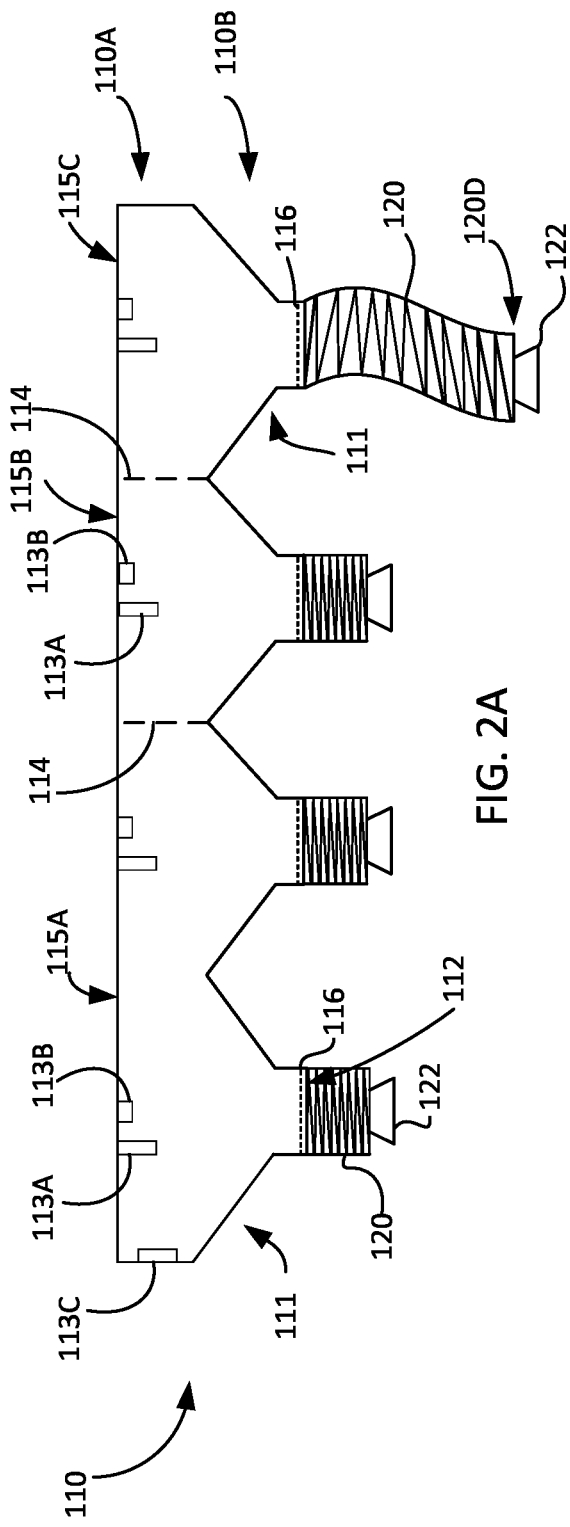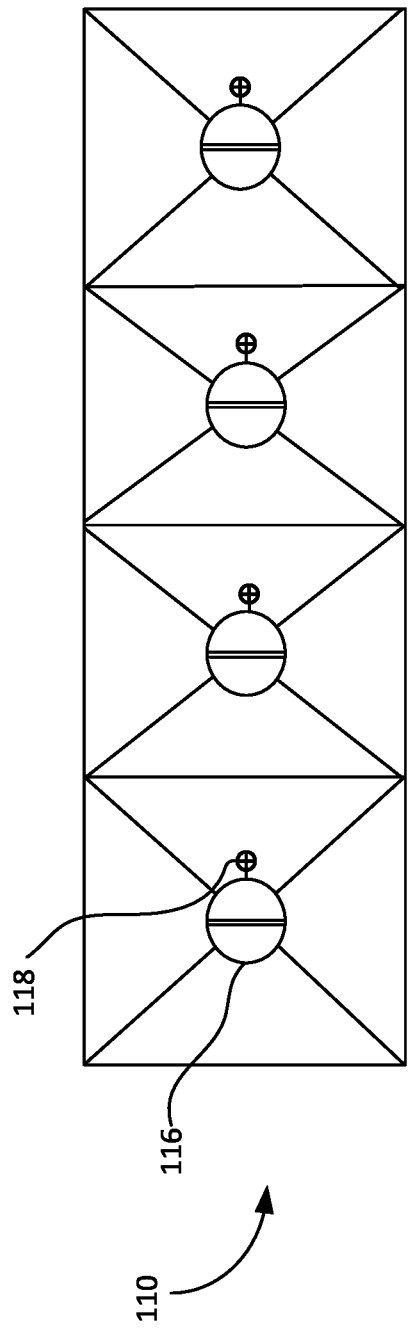
FIG. 2A
FIG. 2B

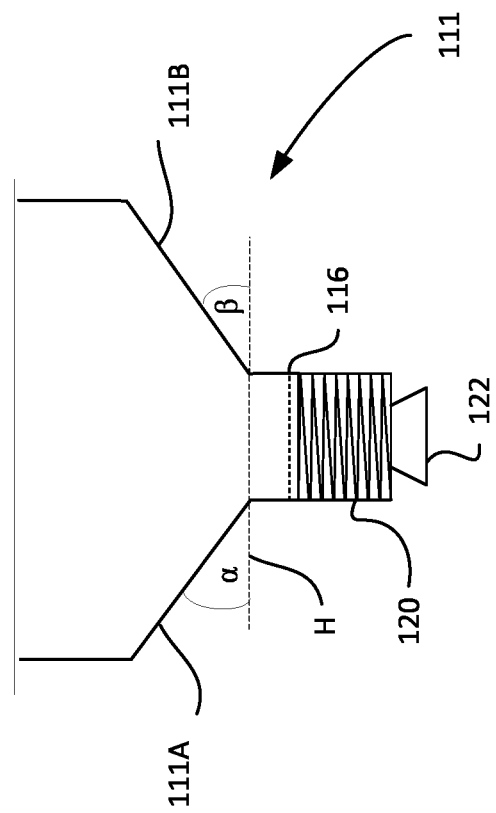

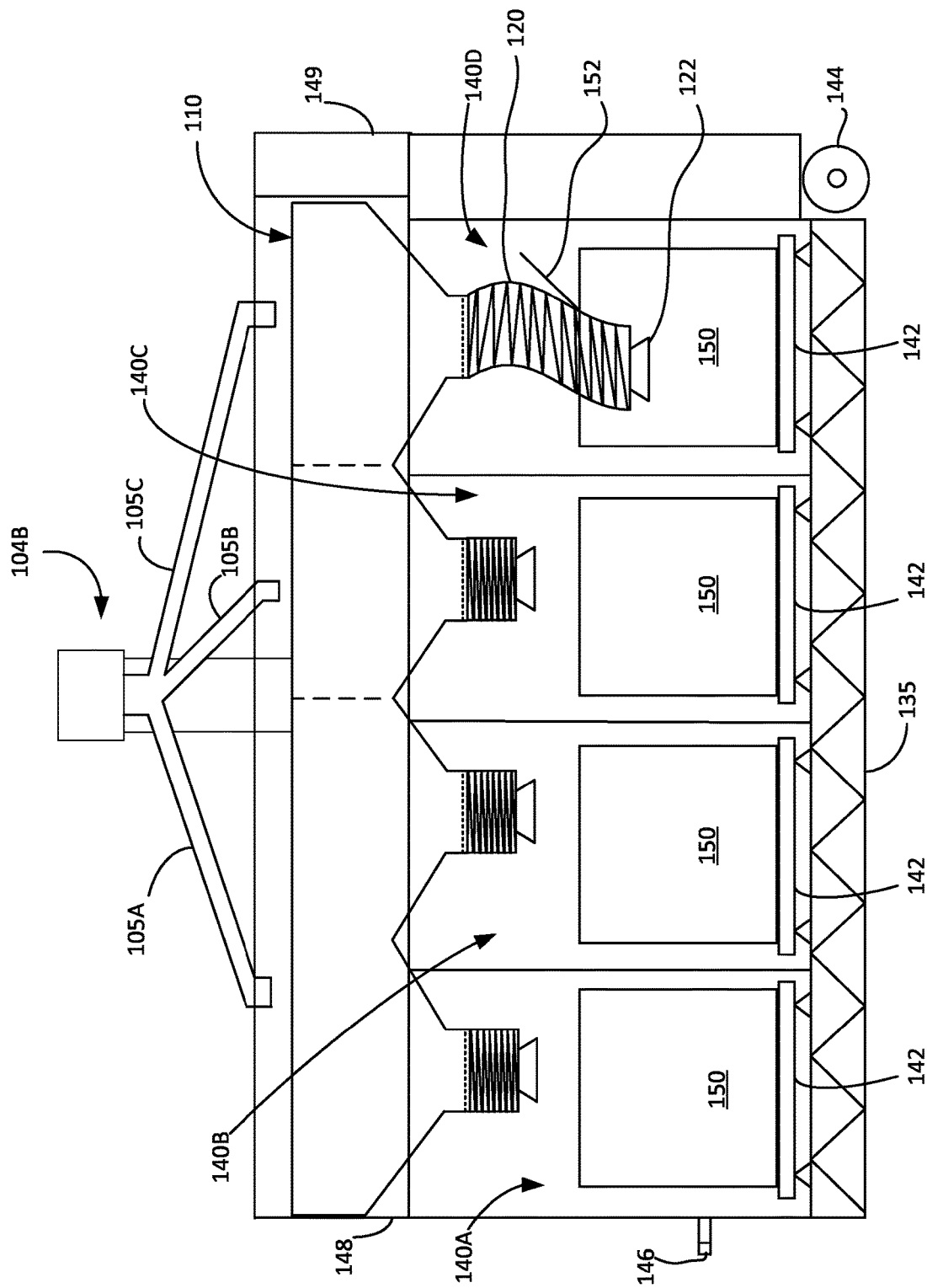

RELOADABLE CONTAINERIZED SYSTEM FOR WET AND DRY PROPPANTS AND METHODS OF MAKING AND USING SAME

CROSS-REFERENCE TO RELATED APPLICATIONS

This application claims priority to U.S. Provisional Patent Application, Ser. No. 63/175,450, titled "Systems and Methods for Reloading Material Storage Containers," and filed Apr. 15, 2021. The disclosure of the '450 Provisional Application is incorporated by reference herein in its entirety.

BACKGROUND

During completion operations for oil and gas wells, hydraulic fracturing operations are often utilized to increase the production from the well. During such hydraulic fracturing operations, a hydraulic fracturing fluid comprising a mixture of fluids, chemicals, and proppants is blended and pumped into the well bore. The particular composition of a hydraulic fracturing fluid can vary from well to well. Further, because of the highly abrasive nature of the fracturing fluid, the fracturing fluid is typically blended at the well site in a blender rather than being pumped from offsite. Accordingly, the necessary components for the fracturing fluid must be present at the well site. Storing these components, and particularly the wet or dry proppants, presents unique challenges to ensure that the fracturing operations are able to proceed efficiently and cost-effectively.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere herein.

In some aspects, the techniques described herein relate to a method for reloading a container with proppant. A method comprises providing a system for reloading containers. The system includes a transloader having a conveyer belt and a discharge device, and a reloading system. The reloading system comprises a bulk material storage bin having a proppant receiving area, a proppant dispensing device having an expandable loading tube, and a gate. The system further includes a reloader having a loading bay including a load cell. The method includes disposing the proppant onto the conveyer belt and causing the discharge device to discharge the proppant into the bulk material storage bin. The method comprises situating the container in the loading bay atop the load cell. The method includes opening the gate and causing the expandable loading tube to expand to deliver the proppant from the bulk material storage bin into the container. The method comprises removing the container from the loading bay after a weight of the container reaches a predetermined weight.

In another embodiment, a system for reloading a container with proppant comprises a transloader having a conveyer belt and a discharge device. The system includes a reloading system comprising a bulk material storage bin having a proppant receiving area, a funnel having an expandable loading tube, and a gate for controlling flow of the proppant from the funnel into the container. The system comprises a reloader comprising a loading bay including a load cell and the container disposed on the load cell.

In yet another embodiment, a method for reloading a container with proppant comprises providing a system for reloading containers. The system comprises a transloader having a conveyer belt and a discharge device, and a reloading system. The reloading system includes a bulk material storage bin having a proppant receiving area, a proppant dispensing device having an expandable loading tube, and a gate. The system further includes a reloader comprising a loading bay including a load cell. The method includes causing the discharge device to discharge the proppant into the bulk material storage bin, situating the container in the loading bay, and causing the expandable loading tube to expand to deliver the proppant from the bulk material storage bin into the container.

BRIEF DESCRIPTION OF THE DRAWINGS

Illustrative embodiments of the disclosure are described in detail below with reference to the attached drawings.

FIG. 2A illustrates a bulk material storage bin of the system of FIG. 1.

FIG. 2B is a bottom view of the bulk material storage bin of FIG. 2A.

FIG. 2C is a front view of a funnel of the bulk material storage bin of FIG. 2A.

FIG. 4 illustrates a front view of a bulk material storage bin as supported by a reloader according to embodiments of the disclosure.

DETAILED DESCRIPTION

Many different storage systems exist for storing proppants for hydraulic fracturing operations. In one example, a silo-style system incorporates a plurality of silos that are transported to a well site where the silos are erected and filled with proppant. The proppant may be delivered to the well site via a truck and trailer, and then conveyed or pneumatically transferred the silos for storage. When the time comes to hydraulically fracture the well, the proppant is dispensed from the silo(s) onto a conveyor or gravity fed and into the blender where it is mixed with water and other chemicals before being sent downhole. The silo systems are beneficial because they offer higher payload compared to other containerized systems. However, the silo systems are expensive, loading systems can be unreliable, and may require specialty equipment in order to erect and/or operate the system.

Containerized storage systems utilize smaller containers to transport and store proppant. Such systems are less expensive and can be safer than silo systems when it comes to reducing silica dust, for example. Additionally, containerized systems are more versatile, as the containers can be more easily moved between locations, and can even be directly coupled to the blender preventing the need for proppant conveyors (and therefore reducing silica dust). However, the containers are not able to hold as much proppant with holding capacities ranging from about 12 tons of proppant per box to around 25 tons of proppant per box. Additionally, containers often require specialized trailers for transport and/or discharge of proppant at the well site. In order to provide the required amount of proppant for a fracking operation, many delivery trucks may be required to deliver numerous containers, sometimes over 100 boxes, increasing the possibility for accidents. Once on location, the storage area for the boxes may be 10,000 square feet or more.

Systems and methods for utilizing a reloadable containerized storage system for a hydraulic fracturing operation are described herein. According to embodiments of the disclosure, a containerized system utilizes a plurality of containers known to the industry for storing proppant. A reloading system allows the containers to be reloaded such that fewer containers are required to be stored at the wellsite. Transportation of proppant to the reloader can be accomplished with any style of bulk material trailer including but not limited to grain style and pneumatic style trailers. Payloads with such trailers can be higher than traditional containerized sand trailers reducing the number of loads to location and environmental impact. Thus, the system blends the efficiencies of silo systems with the reliability and versatility of box systems.

Figure 1:
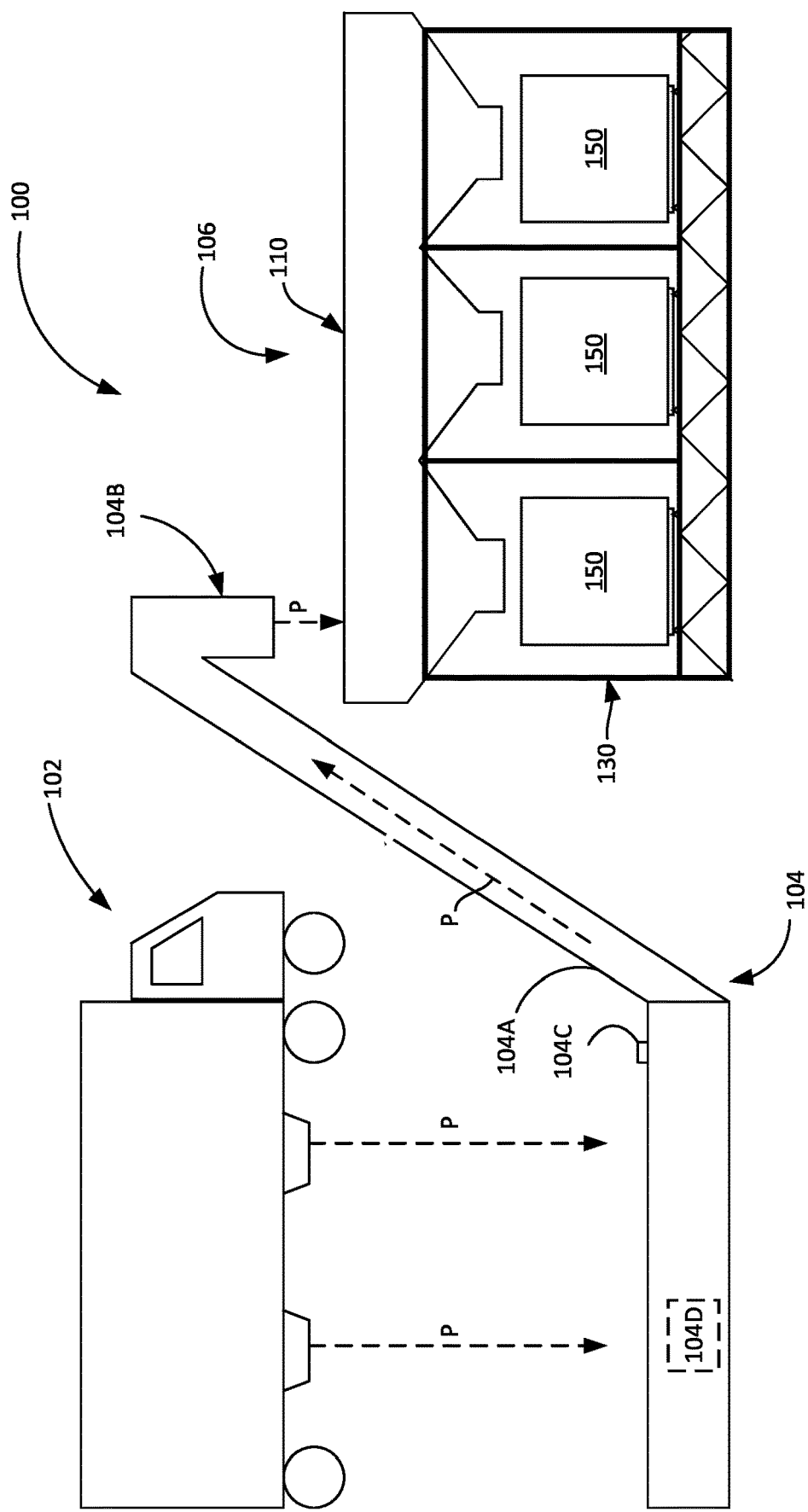
FIG. 1 is a schematic illustration of a system for reloading storage containers according to embodiments of the disclosure.

Referring to FIG. 1, a system 100 for reloading proppant containers includes a delivery vehicle 102, a transloader 104, and a reloading system 106. The reloading system 106, described in detail below, generally includes a bulk material storage bin 110 and a reloader 130. In a highly generalized summary, proppant P for use in hydraulic fracturing operations is delivered to a wellsite via the delivery vehicle 102 and offloaded onto the transloader 104 which deposits the proppant P into the reloading system 106 for reloading containerized proppant units (or simply "containers") 150. The flow of proppant P from the vehicle 102 to the reloading system 106 is represented by the arrows in FIG. 1. One or more components of the system 100 may be in data communication with and controllable by an automated control system 200 (FIG. 6), described in more detail herein.

The proppant P may be dry proppant DP or wet proppant WP. The moisture content of the proppant P may impact the flow of the proppant P from the bulk material storage bin 110 into the container 150 (e.g., all other things being equal, wet proppant WP may flow from the bulk material storage bin 110 into the container 150 at a slower rate than dry proppant DP, and wet proppant WP may have a higher likelihood of getting jammed in the bulk material storage bin 110 relative to dry proppant DP). In embodiments, certain features and workings of the system 100 may be adaptively modified based on the moisture content of the proppant P. In other embodiments, one reloading system 100 may be configured exclusively or primarily for dry proppant DP and another reloading system 100 may be configured exclusively or primarily for wet proppant WP, in line with the teachings of the present disclosure. The term "wet proppant," as used herein, refers to proppant P with a moisture content greater than or equal to one percent. The moisture content may be measured using Equation 1 below or using other suitable methods known in the art or developed in the future.

$$\text{moisture content of proppant} = \frac{(\text{weight of moist proppant} - \text{weight of dry proppant})}{\text{weight of dry proppant}} \quad \text{Equation 1}$$

For instance, if the weight of moist proppant is 102 g and the weight of dry proppant is 90 g, the moisture content of this proppant P is 0.133 or 13.3%. As such, this proppant P may be characterized as wet proppant WP.

The delivery vehicle 102 can be any vehicle configured to deliver proppant P to the wellsite, such as a grain trailer, pneumatic trailer, and the like. Because the delivery vehicle 102 does not need to be specially configured, any available delivery vehicle, or multiple types of delivery vehicles, may deliver proppant to the wellsite. This is beneficial because the operator is not limited by the availability of specific types of trailers or drivers for such trailers. Typically, however, the trailer will have a hopper bottom designed for offloading material at the well site.

The transloader 104 may have a conveyer belt 104A, a discharging device 104B, a moisture content reader 104C, and a controller 104D.

The transloader 104 may be any conveyor-type known to those of skill in the art, for example, an RBT-style transloader, mobile conveyor or auger, or any other conveying mechanism. Regardless of the type, the transloader 104 receives the proppant material P from the delivery vehicle 102 and, via the conveyer belt 104A and discharging device 104B thereof, conveys the proppant material P to the reloading system 106. Specifically, the conveyer belt 104A may convey the proppant material P to the discharging device 104B and the discharging device 104B may convey the proppant material P to the bulk material storage bin 110 of the reloading system 106. The proppant P may ultimately be conveyed from the bulk material storage bin 110 of the reloading system 106 to the container 150 as set forth herein.

The discharging device 104B may be located at a distal end of the transloader 104 and may optionally be selectively movable in order to discharge the proppant P into a particular area of the bulk material storage bin 110. The discharging device 104B is discussed in more detail with reference to FIG. 4.

The moisture content reader 104C may be located on the conveyer belt 104A of the transloader 104 and/or elsewhere (e.g., on the discharging device 104B, within the bulk material storage bin 110, et cetera). The moisture content reader 104C may be any suitable sensor now known or developed in the future that allows for the moisture of the proppant P to be determined, e.g., so as to distinguish between wet proppant WP and dry proppant DP. In embodiments, the readings of the moisture sensor 104C may be fed to the controller 104D in a wired or wireless manner. The moisture content reader 104C may, in embodiments, comprise a grouping of moisture sensors that are placed on the transloader 104 and/or reloading device 106.

The controller 104D may control the operation of the transloader 104 based, e.g., on input from the automated control system 200. For example, the controller 104D may control the operation of the conveyer belt 104A (e.g., start, stop, speed up, or slow down the belt 104A) and/or control the operation of the discharging device 104B (e.g., cause the discharging device 104B to convey proppant P to a particular area of the bulk material storage bin 110) based on input from the automated control system 200. The controller 104D may, in embodiments, use the readings from the moisture content reader 104C to identify the proppant P as one of wet proppant WP and dry proppant DP and communicate same to the automated control system 200. In other embodiments, the controller 104D may communicate the reading of the moisture content reader 104C to the automated control system 200 and the automated control system 200 may determine whether the proppant P is to be categorized as dry proppant DP or wet proppant WP.

As noted above, the reloading system 106 broadly includes a bulk material storage bin 110 and a reloader 130. The bulk material storage bin 110 is a storage vessel for holding and dispensing proppant material P to the containers 150, and may be configured to temporarily store at least 10 tons of proppant. In embodiments, the bulk material storage bin 110 may hold 20, 30, 40, 50, 60, 70, 80, 90, or 100 or more tons of proppant.

Referring now to FIGS. 2A and 2B, the bulk material storage bin 110 includes a proppant receiving area 110A and a proppant dispensing area 110B. The proppant dispensing area 110B may be proximate the reloader 130 relative to the proppant receiving area 110A. Proppant P may be delivered by the transloader 104, and specifically the discharging device 104B thereof, to the proppant receiving area 110A of the bulk material storage bin 110. The proppant P may flow from the proppant receiving area 110A down into the proppant dispensing area 110B and into one or more of the containers 150. The flow of the proppant P from the bulk material storage bin 110 into the containers 150 may be due to gravity, and as discussed herein, may be aided by vibration devices and the like as appropriate. The surfaces of the bulk material storage bin 110 may be configured to ensure that the proppant P flows from the bulk material storage bin 110 into the containers 150 at an appropriate rate such that the containers 150 are filled quickly and efficiently without spillage.

The proppant dispensing area 110B may comprise one or more funnels (or proppant dispensing devices) 111. While four funnels 111 are shown in FIG. 2A, it shall be understood by those of skill in the art that the bulk material storage bin 110 may have fewer than four (e.g., one two, or three—such as shown in FIG. 1) or greater than four (e.g., five or more) funnels 111. Each funnel 111 defines an opening 112 in the bottom of the bulk material storage bin 110 through which proppant P is permitted to flow.

A gate 116 covers each of the openings 112. Each gate 116 may be configured as a knife gate, butterfly gate, or the like. The gate 116 may be coupled to a regulator 118 (FIG. 2B) that is operable to open and close the gate 116 to control the flow of proppant P from the bulk material storage bin 110. The regulator 118 may be controlled hydraulically, pneumatically, electrically, or otherwise as is known to those of skill in the art. As described below, the regulator 118 may be in communication with the automated control system 200 (FIG. 6) that controls the regulator 118, and therefore, the position of the gate 116.

A loading tube 120 may be secured around the opening 112 of each funnel 111, and may be designed to expand and contract to deliver proppant P from the bulk material storage bin 110. A distal end 120D of the loading tube 120 may include a diffuser 122, such as a witch's hat, to aid in spreading the discharged proppant P. The diffuser 122 may facilitate the even spread of the discharged proppant P into the container 150. In embodiments, the expansion and contraction of the loading tube 120 may be controlled via the automated control system 200.

As shown in FIG. 2A, the bulk material storage bin 110, and specifically the proppant receiving area 110A thereof, may optionally be equipped with one or more partitions or dividers 114 separating the vessel 110 into sections 115A, 115B, and 115C. Each section 115A, 115B, and 115C may have associated therewith a solitary funnel 111 or a grouping of funnels 111. The sections 115A, 115B, and 115C may receive different proppant materials P for use in the fracking fluid (e.g., section 115A and section 115B may receive proppant P having different moisture contents). Two partitions 114 are disclosed in the figures; however, it will be understood by those of skill in the art that a single partition 114, or more than two partitions 114, may be situated within the bulk material storage bin 110 to create sections for receiving different types of proppant materials.

The dividers 114, where employed, may be removable or may be fixed. Where the dividers 114 are removable, the bulk material storage bin 110 may be divided into one or more sections in line with the requirements of the job. For example, a divider 114 may be employed to create a section for housing and dispensing dry proppant DP and another section for housing and dispensing wet proppant WP. Dividers 114 may likewise be used to guide the proppant P into a particular container 150. As such, different sections of the bulk material storage bin 110 may have the same type of proppant P.

The bulk material storage bin 110 may comprise one or more measurement devices 113A and one or more actuating devices 113B. The measurement devices 113A and the actuating devices 113B may be situated in the proppant receiving area 110A, the proppant dispensing area 110B (e.g., proximate the gate 116), and/or at another suitable location inside the bulk material storage bin 110.

In embodiments, at least one measurement device 113A and at least one actuating device 113B may be associated with each funnel 111. Thus, while FIG. 2A shows one measurement device 113A and one actuating device 113B associated with each funnel 111, in embodiments, two or a different number of measurement devices 113A and two or a different number of actuating devices 113B may be associated with each funnel 111. In embodiments, one funnel 111 may have a different number of measurement devices 113A or actuating devices 113B associated with it relative to another funnel 111. In some embodiments, the actuating devices 113B may mounted at multiple locations within the system 100 to aid in the flow of proppant P. In embodiments, one or more measurement devices 113A and/or actuating devices 113B may be omitted.

The measurement device 113A, in embodiments, is a sensing device that allows for the determination of a property of the proppant P associated with a particular funnel 111 and/or a section (e.g., section 115A) of the bulk material storage bin 110 associated with that funnel 111. The measurement device 113A may, e.g., be a contact and/or non-contact height sensor, a volume-determining device, or other appropriate device for determining at least one property of the proppant P associated with a particular funnel 111 or section. For example, the measurement device 113A may be a mechanical height sensor, a radar level measurement device, an ultrasonic level sensor, a LIDAR volume sensor, et cetera. The measurement device 113A may, for instance, allow for a height and/or volume of proppant P in the funnel 111 to be determined, so as to ensure that the area of the material storage bin 110 associated with the measurement device 113A is not overfull with proppant P or has an inadequate amount of proppant P.

The actuating device 113B may be any device configured to facilitate the flow of proppant P from the material storage bin 110, e.g., the funnel 111 thereof, into the container 150.

The actuating device 113B may, e.g., be a pneumatic vibrator device, an electrical vibrator device, or other suitable device configured to urge the proppant P from the bulk material storage bin 110 into the container 150. The actuating device 113B may be controlled by the automated control system 200. The actuating device 113B may further be actuated manually by an operator as desired.

The bulk material storage bin 110 may include a controller 113C, which may be housed within the bulk material storage bin 110 or at a suitable location outside the bulk material storage bin 110. The controller 113C may be in data communication with the automated control system 200, and may interact with the measurement device 113A, the actuating device 113B, and/or the regulator 118. For example, the controller 113C may convey measurements taken by the measurement device 113A to the automated control system 200 and control the actuating device 113B and/or the gate 116 based on directions provided by the automated control system 200. For instance, where the measurements from the measurement device 113A indicate that the proppant P is not flowing through the funnel 111 into the container 150 or is flowing downstream at too slow a rate (e.g., at less than 1000 lbs per 30 seconds), the automated control system 200 may cause the controller 113C to activate the actuation device 113B to speed up the flow of proppant P into the container 150 and/or cause the regulator 118 to more fully open the gate 116.

The automated control system 200 may further control the operation of the transloader 104 based on input from the measurement device 113A. For instance, where the measurement device 113A indicates that a particular section (e.g., section 115A) is nearing capacity, the automated control system 200 may cause the discharging device 104B of the transloader 104 to discharge proppant P to a different section (e.g., section 115B).

The automated control system 200 may also regulate the speed of the transloader conveyer belt 104A based on the measurements taken by the measurement device(s) 113A. For example, where the measurement devices 113A indicate the bulk material storage bin 110 is nearing capacity (e.g., the bulk material storage bin 110 is at 85% capacity), the automated control system 200 may, in communication with the transloader controller 104D, reduce the speed of the conveyer belt 104A and generate an alarm (e.g., an audible alarm, a visual alarm, an electronic communication delivered to a mobile device of an operator, et cetera) so that operation of the system 100 may be evaluated. The automated control system 200 may further halt the conveyer belt 104A where the measurements from the measurement devices 113A indicate the bulk material storage bin 110 is at capacity.

FIG. 2C shows an example funnel 111 in more detail. Each funnel 111 may be symmetrical (e.g., a left half of the funnel 111 may be a mirror image of the right half thereof). Alternately, the shape of the funnel 111 may be irregular and may be configured in line with the particular application. Not all funnels 111 need to be identical.

In embodiments, each funnel 111 may have at least one angled wall section 111A and one angled wall section 111B. The angled wall section 111A may make an exterior angle α with a horizontal plane H and the angled wall section 111B may make an exterior angle β with the horizontal plane H. The angle α may, in embodiments, be disparate from the angle β.

While not required, the angles α and β of the wall sections 111A and 111B, respectively, may be adjustable. For example, where the proppant P is determined to be dry proppant DP, at least one of the angle α and the angle β may be set to about thirty degrees (30°) as these angles α and/or β may allow for the dry proppant DP to freely flow from the material storage bin 110 to the container 150 at the appropriate rate. Alternately, where the proppant P is determined to be wet proppant WP, one or both of the angles α and β may be increased, e.g., to about thirty-five degrees (35°) or more. The increased slope of the wall sections 111A and/or 111B may ensure the wet proppant P travels into the appropriate container 150 at the desired rate despite the moisture content of the proppant P.

The wall sections 111A and/or 111B, and therefore the angles α and/or β, may be adjusted manually. Alternately, the wall sections 111A and/or 111B may be motorized and a user may set the angles α and/or β or the automated control system 200 may automatically set these angles based, e.g., on the moisture content of the proppant P and its flow rate into the container 150. In other embodiments still, the wall sections 111A and/or 11!B may be fixed. In these embodiments, a bulk material storage bin 110 may be created for dry proppant DP and a separate bulk material storage system 110 may be created for wet proppant WP such that the angles α and/or β of the wet proppant material storage system 110 are greater than the angles α and/or β of the dry proppant material system 110. In some embodiments, certain funnels 111 of a solitary bulk material storage bin 110 may be designed for wet proppant WP and other funnels 111 of that same bulk material storage bin 110 may be designed for dry proppant DP.

Other changes may likewise be made to the system 100 based on whether the proppant P is dry proppant DP or wet proppant WP. For example, where the reloading system 100 is configured for wet proppant WP, the surfaces of one or more components that are to come into contact with the wet proppant WP may be coated with anti-friction coatings to reduce proppant surface tension and facilitate the flow of the wet proppant WP from the transloader 104 ultimately into the container 150.

Figure 3:
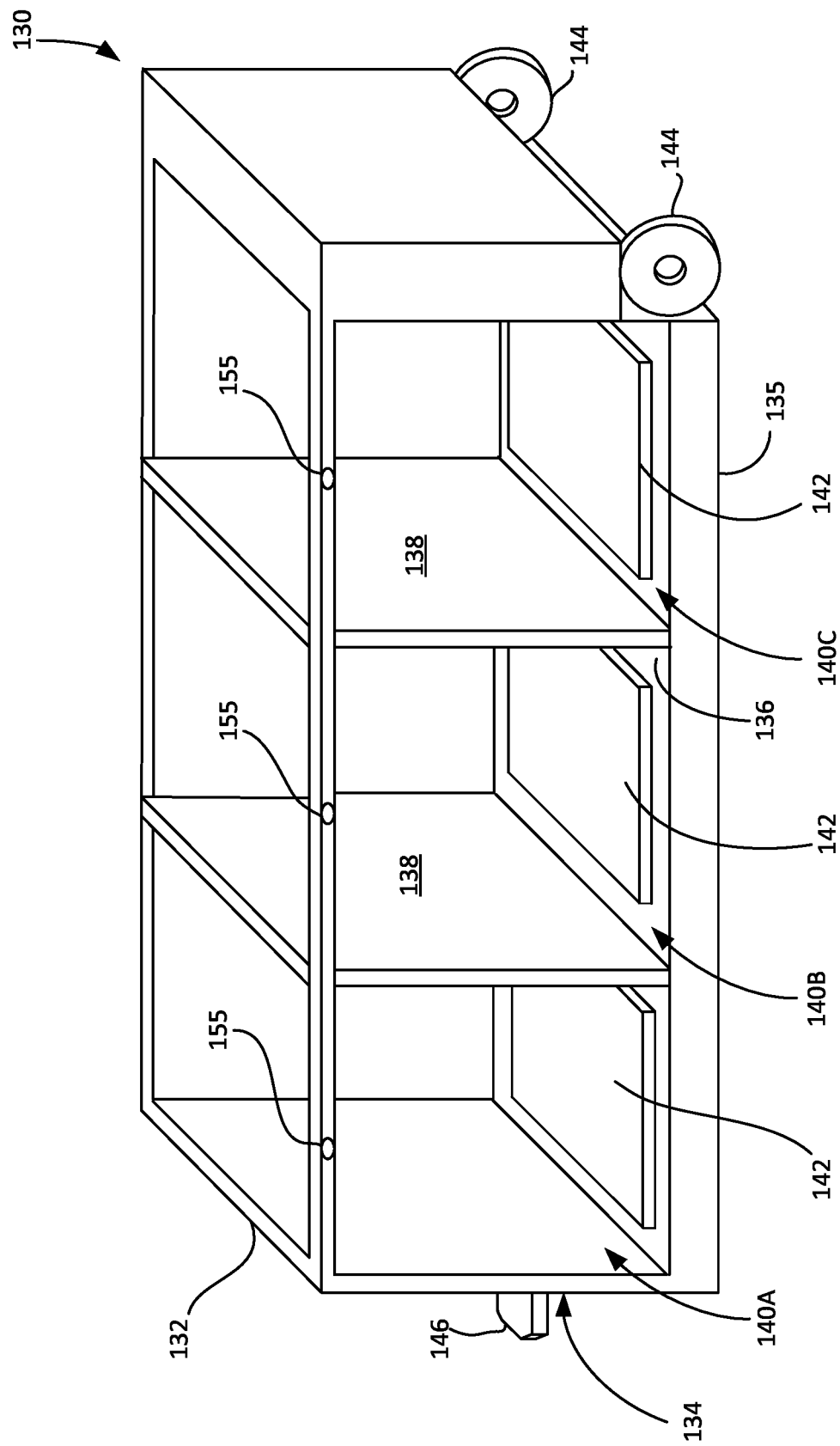
FIG. 3 is a perspective view of a reloader of the system of FIG. 1 according to embodiments of the disclosure.
Figure 5A:
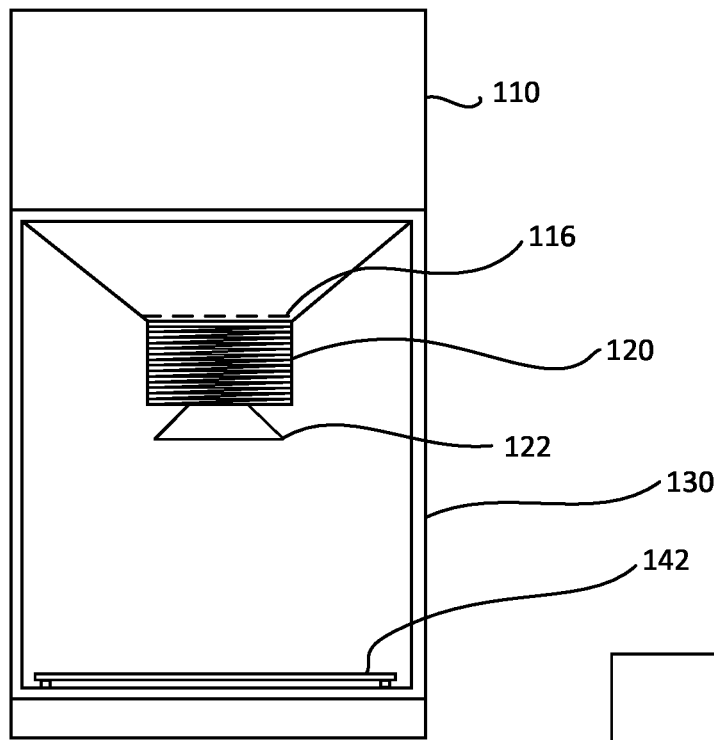
FIGS. 5A and 5B are side views of the bulk material storage bin as supported by the reloader according to embodiments of the disclosure.
Figure 5B:
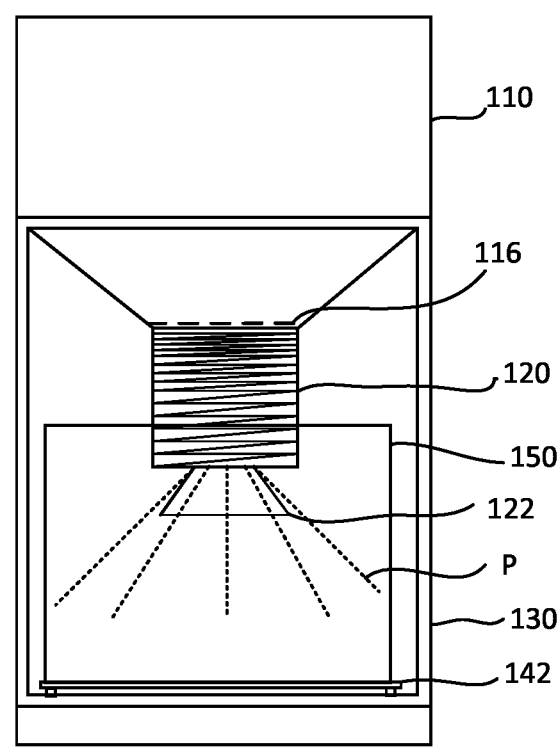

Moving on to FIGS. 3-5B, the bulk material storage bin 110 may be supported on the reloader 130. The reloader 130 includes a frame 132 defining a receiving area 134. The frame 132 has a bottom surface 135 that contacts the ground when in use, and a platform surface or channel guide 136 for supporting one or more containerized proppant units 150. A plurality of partitions 138 may extend between the platform surface 136 and a top of the frame 132 thereby defining a plurality of individual reloading (or loading) bays 140A, 140B, and 140C. While three reloading bays (generally 140) are shown in FIG. 3, it shall be understood that the reloader 130 may have greater than or fewer than three reloading bays. For example, in FIG. 4, the reloader 130 is shown as having four reloading bays 140A-140D. The reloader 130 may, in embodiments, have a solitary reloading bay.

The bulk material storage bin 110 may be lifted to a position atop the reloader 130 using any lifting mechanism, including but not limited to a forklift, standard loader, crane, et cetera, such that each of the funnels 111 extends generally into (or above) a respective reloading bay 140A, 140B, or 140C. The bulk material storage bin 110, in embodiments, may comprise outriggers or another anchoring system that couples the bin 110 to the ground and ensures the bin 110 is not displaced when faced with heavy winds, earthquakes, and the like.

Each reloading bay 140 may include a load cell 142 configured to receive a container 150. The load cell 142 measures a weight of the container 150 in real time. The load cell 142 may be incorporated into a one-size-fits-all table that can receive any container 150. In embodiments, the load cell 142 may be incorporated into an adjustable channel guide configured to receive multiple types of containers 150. Regardless, the load cell 142 may be in operable communication with the automated control system 200 to control the flow of the proppant out of the bulk material storage bin 110 and into the respective container(s) 150 based at least in part on the weight of the respective container(s) 150. In other words, each load cell 142 measures the weight of the respective container 150, and the position of the gate 116 (i.e., open, partially open, or closed) may be automatically controlled based on the weight of the container 150. Further, the actuating device 113B may be activated where the measurements from the load cell 142 indicate that proppant P is not flowing into the container 150 at a suitable rate.

Each empty container 150 may be placed into a respective reloading bay 140 using, for example, a forklift. When the container 150 is placed in the reloading bay 140, a releasing mechanism (e.g., hooks, magnets, etc.) on the reloader 130 may automatically open a fill port or hatch 152 on the container 150 such that the container 150 can receive proppant from the bulk material storage bin 110.

To receive the proppant, the loading tube 120 may expand downwardly toward the open fill port in the container 150. As illustrated in FIG. 4, in embodiments, the loading tube 120 may expand into the container 150 through the open fill port, thereby reducing the amount of silica dust created by movement of the proppant. The tube 120 may have a sealing ring (e.g., rubber, fiber, etc.) that is configured to form a seal on top of the container 150 to reduce the amount of silica dust. The automated control system 200 may control the position of the loading tube 120 relative to the container 150. In embodiments, the loading tube 120 may automatically lower when an empty container 150 (e.g., as determined by the load cell 142) is placed into a reloading bay 140 and may automatically raise when the container 150 is filled.

When the load cell 142 determines that the container 150 is full, the gate 116 may be closed and a light 155 on the reloader 130 above the respective reloading bay 140 may be activated to alert a user that the container 150 is filled and ready to be removed from the reloader 130. As described in greater below, a display may convey the weight of the box and may correspond with a computing device, such as a tablet or computer. Additionally, as the container 150 is removed from the reloader 130, or prior to the container 150 being removed from the reloader 130, the hatch 152 may be automatically closed via the releasing mechanism. In embodiments, the weight of the container 150 may be indicated on the container 150, using, e.g., an RFID tag, an electronic display meter, and/or using other means.

The reloader 130 may further include an enclosure 148 that generally wraps around the bulk material storage bin 110 and the top of the reloader 130 to control silica dust generated by the moving proppant. In embodiments, the enclosure 148 may include a vacuum unit 149 for further filtering the air around the reloader 130.

The reloader 130 may be generally configured as a trailer for easy transport. Accordingly, the reloader may include a plurality of wheels 144 and a hitch 146 for connecting to a vehicle as is known to those in the art. The wheels 144 may be built into the trailer such that when the reloader 130 is in the working position, the bottom surface 135 contacts the ground and the wheels 144 are non-weight bearing. In embodiments, the reloader 130 may be a skid mounted unit that is transported on a separate trailer.

FIG. 4 shows the discharging device 104B of the transloader 104 in more detail. In embodiments, the discharging device 104B may have proppant dispensing arms 105A, 105B, and 105C, and so on. While three arms 105A-105C are shown in FIG. 4, one of skill in the art will understand that the discharging device 104B may include a greater or fewer number of arms.

In some embodiments, the arms 105A-105C may be movable. The movement of the arms 115A-115C may be effectuated manually or using automated devices (e.g., using actuating devices controlled by the automated control system 200). A proppant dispensing arm (e.g., arm 105A) may be moved and resituated to cause that arm to dispense proppant P into the appropriate area of the bulk material storage bin 110 (e.g., to cause arm 105A to dispense proppant P into section 115B instead of section 115A). In embodiments, the slope of the arms 105A-105A may be adjustable, e.g., may be increased when the proppant P is wet proppant WP to facilitate the transfer of the wet proppant WP from the transloader 104 to the bulk material storage bin 110. The distal ends of the arms 105A-105C may be provided with a diffuser or spreader, e.g., a witch's hat, to ensure that the proppant P is distributed into the bulk material storage bin 110, and specifically the sections 115A-115C thereof, relatively evenly.

Figure 6:
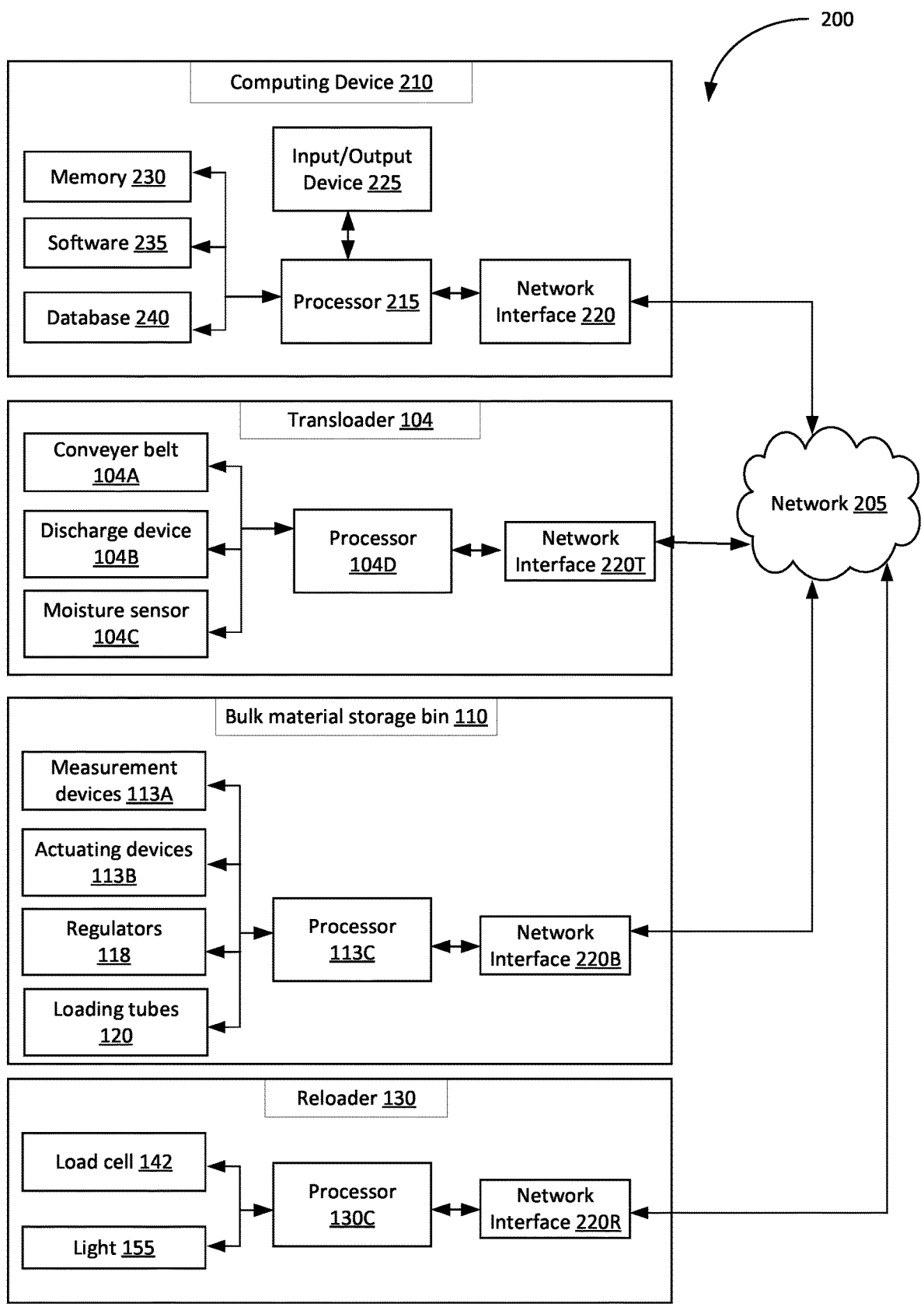
FIG. 6 is a schematic of an automated control system for operating the bulk material storage bin, a transloader, and a reloader of the system for reloading storage containers of FIG. 1, according to embodiments of the disclosure.

Attention is now directed to FIG. 6, which schematically illustrates an automated control system 200 for controlling the reloading system 100. The system 200 includes a computing device 210 communicatively coupled (e.g., via wires or wirelessly over a network 205) to the transloader 104, the bulk material storage bin 110, the reloader 130, and optionally other computing devices. The computing device 210 includes a processor 215 communicatively coupled to a network interface 220, at least one input/output device 225, and memory 230. The processor 215 operates software 235 housed in the memory 230.

Processor 215 represents one or more digital processors. In some example embodiments, the processor 215 may be configured through particularly configured hardware, such as an application specific integrated circuit (ASIC), field-programmable gate array (FPGA), etc., and/or through execution of software to perform functions in accordance with the disclosure herein. Network interface 220 may be implemented as one or both of a wired network interface and a wireless network (e.g., Wi-Fi, Internet, Bluetooth, Cellular, etc.) interface, as is known in the art.

The input/output device 225 may include one or more input and/or output devices which may be embodied in a single device or multiple devices. The input/output device 225 may include a keyboard, a mouse, a stylus pen, buttons, knobs, switches, and/or any other device that may allow a user to provide an input to the system 200 via the computing device 210. In some embodiments, the input/output device 225 may comprise a media port (such as a USB port, or a SD or microSD port) to allow for media (e.g., a USB drive, a SD or microSD drive, laptop memory, smart phone memory, etc.) to be communicatively coupled to the computing device 210. The input/output device 225 may further include one or more visual indicators (e.g., a display), audible indicators (e.g., speakers), or any other such output device now known or subsequently developed. A user may functionally interact with the system 200 via the input/output device 225.

Memory 230 represents one or more of volatile memory (e.g., RAM) and non-volatile memory (e.g., ROM, FLASH, magnetic media, optical media, etc.). Although shown within the computing device 210, memory 230 may be, at least in part, implemented as a network storage that is external to the computing device 210 and accessed via the network interface 220. The memory 230 may house software 235, which may be stored in a transitory or non-transitory portion of the memory 230. Software 235 includes machine readable instructions that are executed by processor 215 to perform the functions described herein. Memory 230 may additionally house a database 240 which may include, for example, information relating to features of the containers (e.g., specific features of specific containers such as the weight of an empty/full PropX® container, or general features such as the average weight of an empty/full, non-specific container). The database 240 may comprise additional information required to operate the system 100, such as the appropriate rate of flow of wet proppant WP and dry proppant DP into the containers 150, the funnel wall section 111A and 111B angles for wet proppant WP and dry proppant DP, the appropriate speed of the conveyer belt 104A based on the moisture content of the proppant P, et cetera.

The computing device 210 may selectively communicate over the network 205 with the transloader 104, the bulk material storage bin 110, and the reloader 130. The computing device 210 may further communicate with other components, such as a mobile device of an operator, and in embodiments, may cause operational data to be stored at a remote location, e.g., on the cloud.

In operation, the processor 215 of the computing device 210 may communicate with controllers associated with each of the transloader 104, the bulk material storage bin 110, and the reloader 130. In some embodiments, some or all of the functionality of the controllers associated with the transloader 104, the bulk material storage bin 110, and the reloader 130 may be incorporated in the controller 215 of the computing device 210. The computing device 210 may be situated within the system 100 (e.g., within an enclosure created in the reloader 130 or elsewhere) or may be remote from the system 100.

As described above, the transloader 104 may have a conveyer belt 104A, a discharge device 104B, a moisture sensor 104C, and a processor 104D. The conveyer belt 104A, the discharge device 104B, and the moisture sensor 104C may be in data communication with the processor 104D. The processor 104D may further be communicatively coupled to a network interface 220T, which may in-turn be coupled over the network 205 to the processor 215 of the computing device 210. In operation, the processor 215 may employ the software 235 and the processor 104D to control the transloader 104. For example, where the processor 215 determines that the bulk material storage bin 110 is nearing capacity, the processor 215 may, via the software 235 and the processor 104D, slow down the speed of the conveyer belt 104A. Similarly, the processor 215 may employ the software 235 and the processor 104D to facilitate discharging of proppant P by the discharging device 104B into the appropriate section 115A-115C of the bulk material storage bin 110 (e.g., where the measurement device(s) 113A indicate that one section, such as section 115A, is nearing or at capacity, the automated control system 200 may divert the proppant P into a different section, such as section 115B and/or 115C). The readings of the moisture sensor 104C may be communicated by the processor 104D to the processor 215; and, where the angled wall sections 111A and 111B are adjustable, the processor 215 may adjust these angled wall sections based on the moisture content of the proppant P, to ensure suitable delivery of the proppant (e.g., wet proppant WP) into the container 150.

The bulk material storage bin 110, as described above, may comprise measurement devices 113A, actuating devices 113B, regulators 118, loading tubes 120, and a processor 113C. The processor 113C may communicate via a network interface 220B with the processor 215, and the processor 215 may control the operation of the bulk material storage bin 110 and/or other components based on the software 235. For example, where a measurement device 113A indicates that the proppant P is not being conveyed to the respective container 150 at a desirable rate (e.g., is jammed), the processor 215 may cause the actuating device 113B to be activated and/or cause the regulator 118 to more fully open the gate 116. Or, for instance, where a measurement device 113A indicates that the bulk material storage bin 110 or a section 115A-115C thereof is overfull, the processor 215 may halt the conveyer belt 104A and generate an alarm. As another example, the processor 215 may, using the software 235, cause the loading tube 120 to expand downwardly into a container 150 for dispensing the proppant P therein.

The reloader 130, as detailed above, may include a load cell 142 and a light 155. The reloader may further comprise a processor 130C and a network interface 220R to allow for bidirectional communication between the reloader 130 and the processor 215. For example, where the load cell 142 indicates that the container 150 is empty and ready to be refilled, the processor 215 may use this information to cause the regulator 118 to open the gate 116 and start the refilling process. Similarly, the processor 215 may cause the regulator 118 to close the gate where the load cell 142 indicates the container 150 is full (e.g., has reached a weight of a full container 150 as set forth in the database 240), or partially open or close the gate based on the actual versus desired flow rate of proppant P into the container.

Thus, the automated control system 200 may control one or more components of the transloader 104, the bulk material storage bin 110, and the reloader 130, to ensure that the containers 150 are refilled as desired.

Figure 7:
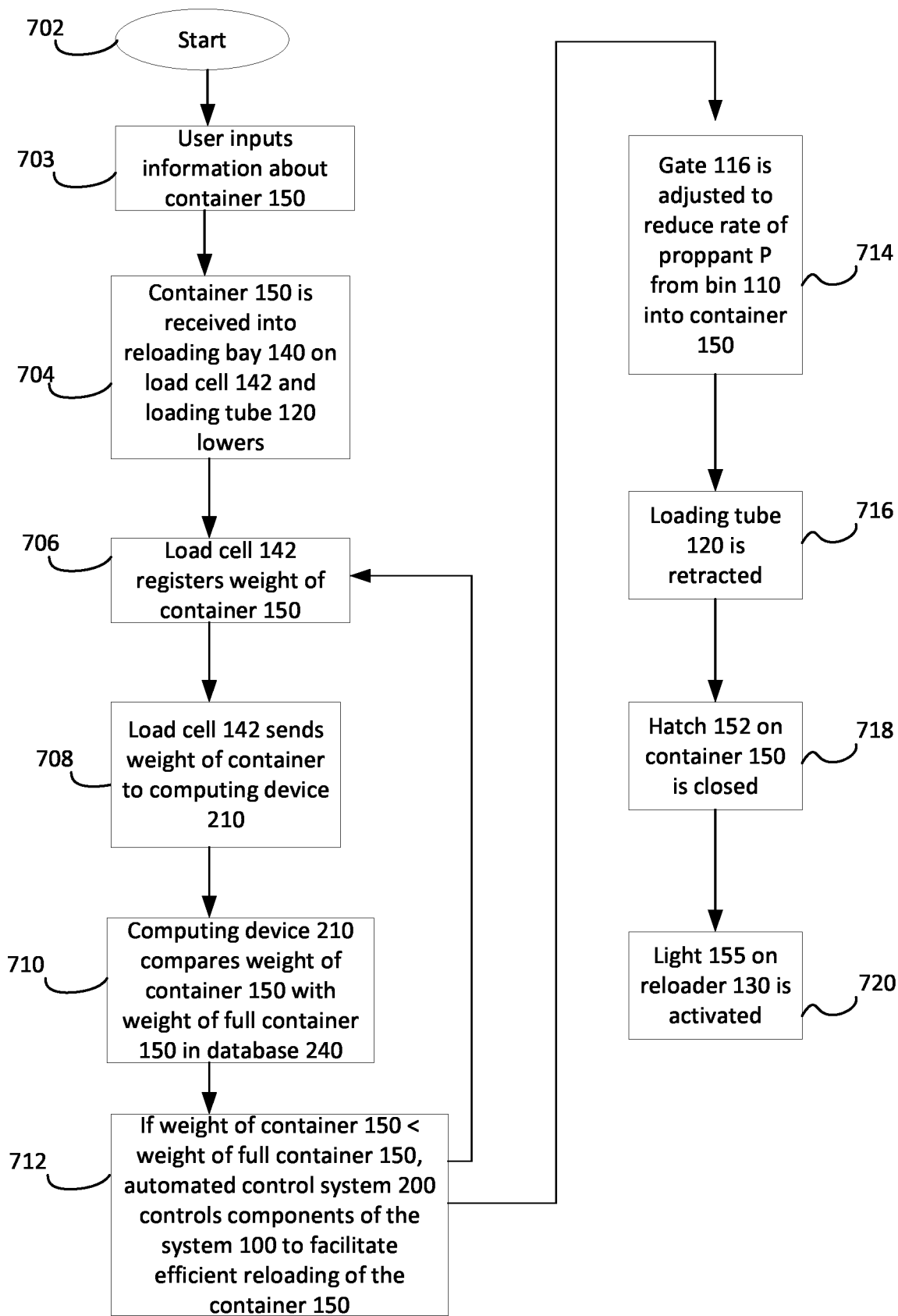
FIG. 7 is a flow diagram of a method of operating a reloading system according to embodiments of the disclosure.

FIG. 7 is a flow chart generally illustrating the application of software 235 for controlling the system 100. At step 702, the process begins. Optionally, at step 703, a user inputs (e.g., via the input/output device 225 or a remote device) information about the container 150 (e.g., selects a type of container such that the computing device 210 can pull relevant data from the database 240). At step 704, a container 150 is received onto the load cell 142 and the loading tube 120 lowers to the container 150. The load cell 142 registers the weight of the container 150 at step 706, and the weight of the container 150 is sent to the computing device 210 (or is requested by the computing device 210) at step 708.

At step 710, the computing device 210 compares the weight of the container 150 as determined by the load cell 142 to the expected weight of a full container 150 as stored in the database 240. If the weight of the container 150 is less than the expected weight of a full container 150, the computing device 210 controls the components of the system 100 to facilitate efficient reloading of the container 150.

Step 712 may comprise one or more of a plurality of sub-steps, as described in greater detail herein. For example, step 712 may include causing the regulator 118 to partially open, partially close, or fully open the gate 116, activating the actuating devices 113B to urge proppant P into the container 150 where it is determined the proppant P is not flowing into the container 150 at a desirable rate, altering the angles of the wall sections 111A and/or 111B based on the moisture content of the proppant P, regulating the speed of the conveyer belt 104A, et cetera.

Steps 706-712 are repeated until the load cell 142 registers that the weight of the container 150 is approaching the expected weight of a full container 150, as outlined in the database 240. When the load cell 142 registers that the weight of the container 150 is approaching the expected weight of a full container 150, the process moves to step 714, where the position of the gate 116 is adjusted to slow the rate of the proppant P from the bulk material storage bin 110 to the container 150. Step 714 may be repeated as necessary until the load cell 142 determines that the container is full, at which point the process moves to step 716. At step 716, the tube 120 may be retracted. Then, at step 718, the hatch 152 on the container 150 may be closed. Finally, at step 720, the light 155 on the reloader 130 at the corresponding reloading bay 140 is activated to signal that the container 150 is ready to be removed from the reloader 130. When the container 150 is removed from the reloading bay 140, the process starts over. The process may begin again at step 703 with information being input into the system, or the process may skip to step 704 with a container 150 being loaded into a reloading bay 140 for filling. At each step in the process, relevant information, such as the weight of the container 150, may be displayed via the input/output device 225 of the one or more computing devices 210.

Each of the various components described herein may be powered using an external power source, such as a generator, a turbine, or pulling from powered system such as a containerized sand belt. However, any power source, or multiple power sources, may be utilized to provide power to the system.

By incorporating a system for reloading containerized sand units 150 as described herein, it may be possible to reduce the containerized sand footprint at the wellsite by reducing the number of containers needed substantially (e.g., a reduction of 5% to 30% or more). With fewer containers at the wellsite, it may be easier to track the containers at the wellsite. Additionally, it may be possible to reduce the amount of space required to operate the system 100 as compared to standard container systems.

Many different arrangements of the various components depicted, as well as components not shown, are possible without departing from the spirit and scope of the disclosure. Embodiments of the disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the disclosure. It will be understood that certain features and subcombinations are of utility and may be employed without reference to other features and subcombinations are and contemplated within the scope of the disclosure.

What is claimed is:

1. A method for reloading a container with proppant, comprising:
    providing a system for reloading containers, comprising:
        a transloader having a conveyer belt and a discharge device; and
        a reloading system, comprising:
            a bulk material storage bin having a proppant receiving area, a proppant dispensing device having an expandable loading tube, and a gate; and
            a reloader comprising a loading bay having a load cell;
    situating a measurement device in said bulk material storage bin;
    disposing said proppant onto said conveyer belt;
    reducing a speed of said conveyer belt based on a reading of said measurement device;
    causing said discharge device to discharge said proppant into said bulk material storage bin;
    situating said container in said loading bay atop said load cell;
    opening said gate and causing said expandable loading tube to expand to deliver said proppant from said bulk material storage bin into said container; and
    removing said container from said loading bay after a weight of said container reaches a predetermined weight.

2. The method of claim 1, further comprising locating an actuating device within said bulk material storage bin.

3. The method of claim 2, further comprising activating said actuating device based on a reading of said measurement device.

4. A method for reloading a container with proppant, comprising:
    providing a system for reloading containers, comprising:
        a transloader having a conveyer belt and a discharge device; and
        a reloading system, comprising:
            a bulk material storage bin having a proppant receiving area, a proppant dispensing device having an expandable loading tube, and a gate, the proppant dispensing device having an angled surface; and
            a reloader comprising a loading bay having a load cell;
    setting an angle of said angled surface based on a moisture content of said proppant;
    disposing said proppant onto said conveyer belt;
    causing said discharge device to discharge said proppant into said bulk material storage bin;
    situating said container in said loading bay atop said load cell;
    opening said gate and causing said expandable loading tube to expand to deliver said proppant from said bulk material storage bin into said container; and
    removing said container from said loading bay after a weight of said container reaches a predetermined weight.

5. The method of claim 1, wherein said dispensing device is a funnel.

6. The method of claim 1, wherein said dispensing device comprises a plurality of dispensing devices, each of said plurality of dispensing devices comprising a funnel.

7. The method of claim 1, further comprising providing a computing device to control a flow of said proppant into said container.

8. A system for reloading a container with proppant, comprising:
    a transloader having a conveyer belt and a discharge device;
    a moisture sensor disposed on said transloader; and
    a reloading system, comprising:
        a bulk material storage bin having a proppant receiving area, a funnel having an expandable loading tube, and a gate for controlling flow of said proppant from said funnel into said container;
        a measurement device associated with said bulk material storage bin;
        a reloader comprising a loading bay having a load cell and said container disposed on said load cell; and
        an actuating device associated with said bulk material storage bin and configured to urge said proppant into said container.

9. The system of claim 8, further comprising a computing device in data communication with each of said actuating device, said measurement device, and said expandable loading tube.

10. The system of claim 8, wherein said reloader includes an enclosure and a vacuum unit.

11. A method for reloading a container with proppant, comprising:
   providing a system for reloading containers, comprising:
      a transloader having a conveyer belt and a discharge device; and
      a reloading system, comprising:
         a bulk material storage bin having a proppant receiving area, a proppant dispensing device having an expandable loading tube, and a gate; and
         a reloader comprising a loading bay having a load cell;
   setting an angle of an angled surface of said proppant dispensing device based on a moisture content of said proppant;
   causing said discharge device to discharge said proppant into said bulk material storage bin;
   situating said container in said loading bay; and
   causing said expandable loading tube to expand to deliver said proppant from said bulk material storage bin into said container.

12. The method of claim 11, further comprising providing a computing device having a database, and filling said container with said proppant based on a predetermined amount set forth in said database.

13. The method of claim 11, further comprising providing a diffuser at an end of said proppant dispensing device.

14. The method of claim 4, further comprising locating an actuating device within said bulk material storage bin.

15. The method of claim 4, wherein said dispensing device is a funnel.

16. The method of claim 4, wherein said dispensing device comprises a plurality of dispensing devices, each of said plurality of dispensing devices comprising a funnel.

17. The method of claim 4, further comprising providing a computing device to control a flow of said proppant into said container.

\* \* \* \* \*